US011501224B2

(12) United States Patent
Lien

(10) Patent No.: US 11,501,224 B2
(45) Date of Patent: Nov. 15, 2022

(54) PROJECT MANAGEMENT SYSTEM WITH CLIENT INTERACTION

(71) Applicant: Andersen Corporation, Bayport, MN (US)

(72) Inventor: Jeff Lien, Clayton, WI (US)

(73) Assignee: Andersen Corporation, Bayport, MN (US)

( * ) Notice: Subject to any disclaimer, the term of this patent is extended or adjusted under 35 U.S.C. 154(b) by 296 days.

(21) Appl. No.: 16/256,486

(22) Filed: Jan. 24, 2019

(65) Prior Publication Data

US 2019/0228370 A1     Jul. 25, 2019

Related U.S. Application Data

(60) Provisional application No. 62/621,190, filed on Jan. 24, 2018.

(51) Int. Cl.
| | |
|---|---|
| *G06Q 10/00* | (2012.01) |
| *G06Q 10/06* | (2012.01) |
| *G06T 15/20* | (2011.01) |
| *G06T 19/00* | (2011.01) |

(52) U.S. Cl.
CPC ............... *G06Q 10/063118* (2013.01); *G06Q 10/063112* (2013.01); *G06T 15/20* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,094,625 A | * | 7/2000 | Ralston ............... G01C 15/00 239/161 |
| 6,381,583 B1 | | 4/2002 | Kenney |
| 6,765,569 B2 | | 7/2004 | Neumann et al. |
| 6,952,496 B2 | | 10/2005 | Krumm |
| 7,204,428 B2 | | 4/2007 | Wilson |

(Continued)

OTHER PUBLICATIONS

Woksepp, Stefan, and Thomas Olofsson. "Using virtual reality in large-scale industry project." Electronic journal of information technology in construction 11 (2006): 627-640. (Year: 2006).*

(Continued)

*Primary Examiner* — Gurkanwaljit Singh
(74) *Attorney, Agent, or Firm* — Pauly, DeVries Smith & Deffner LLC

(57) ABSTRACT

Embodiments herein relate to building component project management systems and methods. In an embodiment, a building component project management system is included herein having a database configured to store records regarding an installation project, an image generation system configured to render a view including a view of a building component superimposed over a view of an actual installation environment, and a user identification system configured to identify a system user and configure the data that is part of the view rendered by the image generation system according to the identified user. The system can be configured to record and store a set of physical dimensions of the actual installation environment in the database along with product selections made by a customer associated with the installation environment. Other embodiments are also included herein.

20 Claims, 13 Drawing Sheets

(56) References Cited

U.S. PATENT DOCUMENTS

| | | | |
|---|---|---|---|
| 7,274,380 B2 | 9/2007 | Navab et al. | |
| 7,277,572 B2 | 10/2007 | Macinnes et al. | |
| 7,283,214 B2 | 10/2007 | Xu et al. | |
| 8,502,835 B1 | 8/2013 | Meehan | |
| 8,606,657 B2 | 12/2013 | Chesnut et al. | |
| 8,626,571 B2* | 1/2014 | Nielsen | G06Q 10/06395 |
| | | | 705/7.41 |
| 8,922,590 B1 | 12/2014 | Luckett, Jr. et al. | |
| 8,994,645 B1 | 3/2015 | Meehan | |
| 9,147,213 B2 | 9/2015 | Beaver, Iii et al. | |
| 9,164,577 B2 | 10/2015 | Tapley et al. | |
| 9,767,720 B2 | 9/2017 | Kinnebrew et al. | |
| 9,817,848 B2 | 11/2017 | Mckinnon et al. | |
| 9,965,787 B2 | 5/2018 | Frederick et al. | |
| 10,049,276 B1 | 8/2018 | Harper et al. | |
| 10,089,681 B2 | 10/2018 | Ramos et al. | |
| 10,127,733 B2 | 11/2018 | Soon-shiong | |
| 10,311,637 B2* | 6/2019 | Bharti | G02B 27/0172 |
| 11,024,088 B2* | 6/2021 | Heinen | G06T 15/04 |
| 2002/0093538 A1 | 7/2002 | Carlin | |
| 2003/0014212 A1* | 1/2003 | Ralston | H04N 13/366 |
| | | | 348/E13.059 |
| 2003/0046689 A1* | 3/2003 | Gaos | H04N 21/42203 |
| | | | 715/745 |
| 2003/0174178 A1 | 9/2003 | Hodges | |
| 2004/0249497 A1* | 12/2004 | Saigh | E04H 14/00 |
| | | | 700/216 |
| 2005/0046584 A1* | 3/2005 | Breed | B60R 21/01536 |
| | | | 340/13.31 |
| 2006/0289637 A1* | 12/2006 | Brice | G06Q 10/087 |
| | | | 235/383 |
| 2007/0038944 A1 | 2/2007 | Carignano et al. | |
| 2007/0043466 A1 | 2/2007 | Vesely et al. | |
| 2007/0086624 A1* | 4/2007 | Breed | B60R 21/01552 |
| | | | 382/104 |
| 2007/0138268 A1* | 6/2007 | Tuchman | G06Q 30/06 |
| | | | 235/383 |
| 2007/0202472 A1 | 8/2007 | Moritz | |
| 2009/0063557 A1* | 3/2009 | MacPherson | G06N 5/02 |
| 2010/0064596 A1* | 3/2010 | Bowsher | G06T 15/00 |
| | | | 52/204.5 |
| 2012/0113140 A1 | 5/2012 | Hilliges et al. | |
| 2012/0190386 A1* | 7/2012 | Anderson | H04L 67/306 |
| | | | 455/456.3 |
| 2012/0194554 A1 | 8/2012 | Kaino et al. | |
| 2012/0299963 A1 | 11/2012 | Wegrzyn et al. | |
| 2013/0073388 A1* | 3/2013 | Heath | G06Q 50/01 |
| | | | 705/14.53 |
| 2013/0128011 A1 | 5/2013 | Tu et al. | |
| 2013/0155058 A1* | 6/2013 | Golparvar-Fard | |
| | | | G06Q 10/06311 |
| | | | 345/419 |
| 2014/0257862 A1* | 9/2014 | Billman | G06Q 40/08 |
| | | | 705/4 |
| 2016/0259341 A1* | 9/2016 | High | H04W 4/40 |
| 2017/0053042 A1* | 2/2017 | Sugden | G06F 3/012 |
| 2017/0330063 A1 | 11/2017 | Cheung | |
| 2018/0109756 A1* | 4/2018 | White | H04N 7/147 |
| 2020/0312029 A1* | 10/2020 | Heinen | G06T 19/006 |

OTHER PUBLICATIONS

Asgari, Zeynab, and Farzad Pour Rahimian. "Advanced virtual reality applications and intelligent agents for construction process optimisation and defect prevention." Procedia engineering 196 (2017): 1130-1137. (Year: 2017).*

Fernandes, Kiran Jude, et al. "Adoption of virtual reality within construction processes: a factor analysis approach." Technovation 26.1 (2006): 111-120. (Year: 2006).*

Jiao, Yi, et al. "Towards cloud augmented reality for construction application by BIM and SNS integration." Automation in construction 33 (2013): 37-47. (Year: 2013).*

Moon, D., et al. "Augmented reality-based on-site pipe assembly process management using smart glasses." ISARC. Proceedings of the International Symposium on Automation and Robotics in Construction. vol. 32. IAARC Publications, 2015. (Year: 2015).*

Renner, Patrick, and Thies Pfeiffer. "Evaluation of attention guiding techniques for augmented reality-based assistance in picking and assembly tasks." Proceedings of the 22nd international conference on intelligent user interfaces companion. 2017. (Year: 2017).*

Zhou, Ying, Hanbin Luo, and Yiheng Yang. "Implementation of augmented reality for segment displacement inspection during tunneling construction." Automation in Construction 82 (2017): 112-121. (Year: 2017).*

* cited by examiner

PROJECT MANAGEMENT SYSTEM WITH CLIENT INTERACTION

This application claims the benefit of U.S. Provisional Application No. 62/621,190, filed Jan. 24, 2018, the content of which is herein incorporated by reference in its entirety.

FIELD

Embodiments herein relate to project management systems. More specifically, embodiments herein relate to building component project management systems and methods.

BACKGROUND

Building components are installed when structures are originally built, but they are also installed later in repair and upgrade scenarios. Building components of this nature can include building components that are visible to the building occupants including, but are not limited to, fenestration units such as windows and doors, carpet, fixtures, trim pieces, and the like.

Many different selections must be made including product styles, colors, configurations, etc. Those selections must be compatible with one another and a product matching those selections must be obtained or manufactured. The building component must also be installed and thereafter service requests must be attended to. These various steps can be both complex and time consuming. In addition, these various steps involve the coordinated activity of multiple people spread across multiple geographic locations.

SUMMARY

Embodiments herein relate to building component project management systems. In some embodiments, a building component project management system is included herein. The building component project management system can include a database configured to store records regarding a building component project. The building component project management system can include an image generation system configured to render a view including a view of a building component superimposed over a view of a surrounding physical environment and data specific to the installation project. The building component project management system can include a user identification system configured to identify a system user and configure the data that is part of the view rendered by the image generation system according to the identified user. The system can be configured to record and store in the database a set of physical dimensions of the surrounding physical environment. The system can also be configured to record and store product selections made by a customer in the database.

In an embodiment, a method of managing a building component project is included. The method can include rendering a view of a building component superimposed over a view of a surrounding physical environment. The method can also include receiving a building component selection from a customer. The method can also include rendering a view of the building component selection superimposed over a view of a surrounding environment. The method can also include storing information regarding the building component selection in a database. The method can also include obtaining dimensional information regarding the environment. The method can also include storing dimensional information in the database. The method can also include queueing preparation of the building component selection. The method can also include remotely interfacing with the customer regarding details of the building component selection using information stored in the database. The method can also include queuing an installation event after the building component selection is prepared.

In an embodiment, a building component project management system is included. The system can include a database configured to store records in files regarding an installation project in an installation environment. The system can also include a data input manager comprising at least one data input interface between a data input device and the database. The system can also include a data output manager comprising at least one data output interface between the database and a data output device. The system can also include a user identification system configured to match user identification codes with predetermined database files. In some embodiments, the database files can include at least one of physical dimensions of the installation environment; data for generating graphical portrayals of the installation environment; data for generating graphical portrayals of components that may be selected for installation; data for generating graphical portrayals of the installation environment with components installed; data on physical conditions of the installation environment; scheduling information; and data for generating graphical portrayals of components selections made by a customer.

BRIEF DESCRIPTION OF THE FIGURES

Aspects may be more completely understood in connection with the following drawings, in which.

Figure 1:
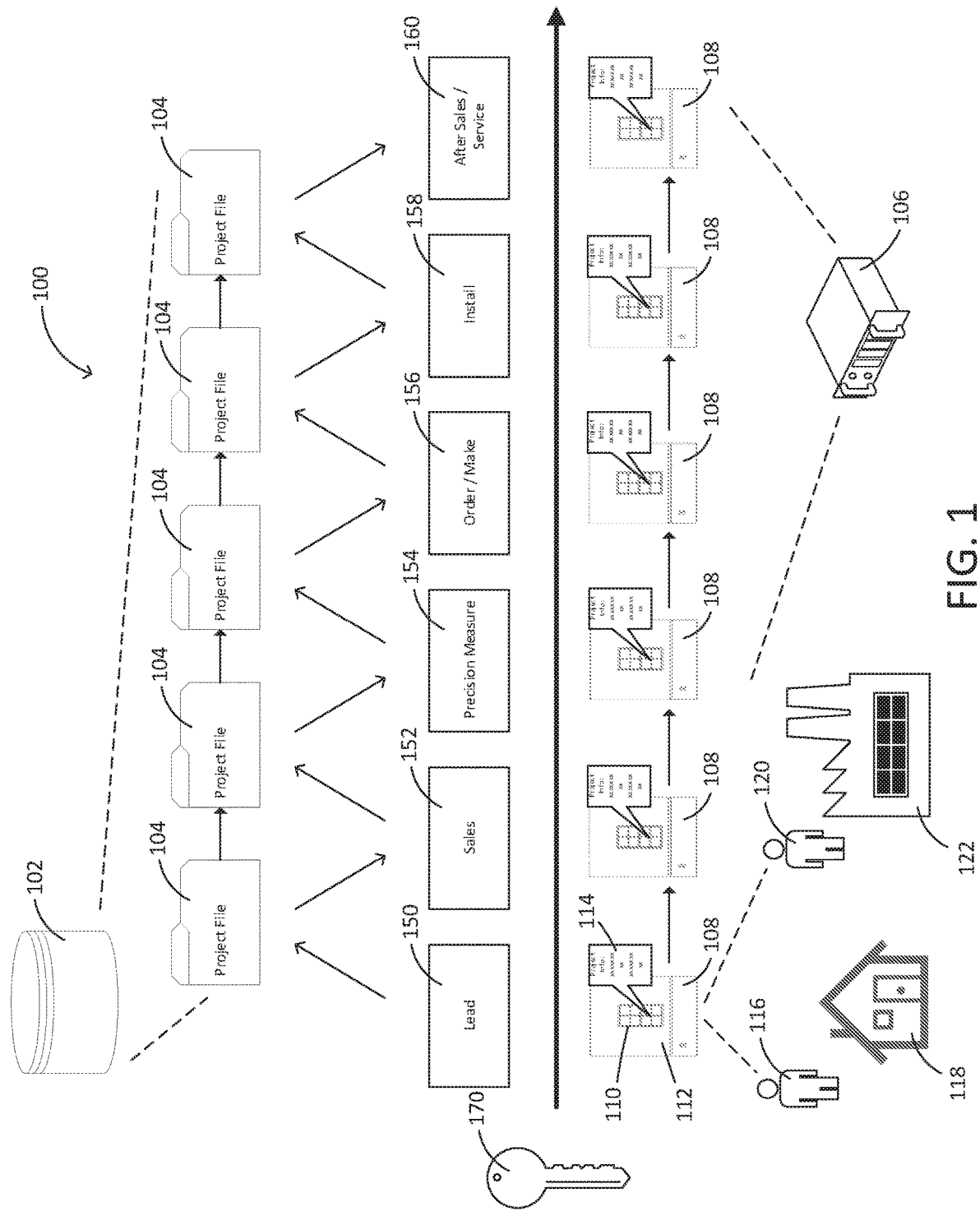
FIG. 1 is a schematic view of a building component project management system in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Building component projects can include many people and can span a significant amount of time and include many steps that need to be coordinated. By way of example, initial sales leads can be followed by a customer making specific product selections. Specific product selections made by a customer can be followed by a sales contract. A sales contract can be followed by obtaining precise measurements necessary to obtain and/or manufacture a building component with the proper dimensions. Obtaining precise measurements can be followed by production queueing and manufacturing of the building component. Installation of the building component can be scheduled for a time after building component manufacturing is completed.

Aspects of a building component project can even extend beyond the time of installation. For example, after installation, various service and/or follow-up activities can take place.

In accordance with embodiments herein, a building component project management system can facilitate and/or coordinate building component project steps. The effectiveness of the system can be greatly enhanced by interactive features that enable the customer to interact with the system as well as with customer assistance personnel and other people involved in carrying out the project.

At various steps of the building component process, views of a building component can be rendered in order to aid in execution of the step. More specifically, at various steps of the process, views can be rendered including images of building components superimposed over currently installed building components to be replaced along with actual views of the environment in which the building components will be installed. As such, virtual reality, augmented reality and/or mixed reality views can be rendered by the building component project management system herein in order to aid in execution of various steps of the process.

For example, at the sales lead step or at the step of a customer making specific product selections, the system can render a virtual reality, augmented reality or mixed reality view of a possible building component superimposed over an actual view of a surrounding environment. Providing this virtual reality, augmented reality or mixed reality view can substantially aid a customer in picking out an appropriate building component because they can quickly see the possibility in their own installation environment. Similarly, rendering a virtual reality, augmented reality or mixed reality view of a possible building component superimposed over an actual view of a surrounding environment for installation can substantially aid a sales person or customer service representative in helping the customer with product selections, product selection changes, questions that may arise after the sales process, and/or service issues after product installation.

A data repository, such as data within one or more tables of a database, can be updated throughout the process in order to provide data to be able to properly render views. In various embodiments, a customer can be assigned a unique key in order to facilitate them accessing information regarding their building component order. In some embodiments, the customer can be given a token or access credentials that are linked with the unique key in order to enable them to access information and, in particular, see virtual reality, augmented reality, or mixed reality views of the building component they have selected as superimposed over an actual image of their surrounding environment (installation environment). The token can be real or virtual. The actual image of their particular environment can be gathered in real-time such as a live image, or can be obtained and stored in advance and then later retrieved to render the desired view.

In some embodiments, a unique key can also be associated with the specific installation address so that data regarding the installation process can continue to provide value and facilitate service and/or possible additional building components at the same property address long after a previous property owner has moved on.

As used herein, the term "mixed reality" shall refer to views that represent a merging of real and virtual images and/or objects to produce visualizations where physical and digital objects co-exist. "Mixed reality" can also be referred to as "hybrid reality". "Mixed reality" shall encompass both the concepts of augmented reality and augmented virtuality.

As used herein, the term "augmented reality" shall refer to views that superimpose a computer-generated image on a user's view of the real world, thus providing a composite view.

As used herein, the term "virtual reality" shall refer to views that are computer-generated simulation of a three-dimensional image or environment that can be interacted with in a seemingly real or physical way by a person.

Various embodiments of the system will now be illustrated with reference to the figures. However, it will be appreciated that these are only provided by way of example and do not serve to limit the scope herein. Referring now to FIG. 1, a schematic view is shown of a building component project management system 100 in accordance with various embodiments herein. A database 102 can be configured to store records in the project file 104 regarding an installation project. The records can include various pieces of data including, but not limited to, physical dimensions of the installation environment; data for generating graphical portrayals of the installation environment; data for generating graphical portrayals of components that may be selected for installation; data for generating graphical portrayals of the installation environment with components installed; data on physical conditions of the installation environment; scheduling information; and data for generating graphical portrayals of components selections made by a customer.

An image generation system 106 can be configured to render a view 108 including a view of a building component 110 superimposed over a view of a surrounding environment 112 and a user interface panel 114 including data 134 specific to the installation project. Details regarding exemplary image generation systems are described in greater detail below.

The view 108 created by image generation system can be seen by a customer 116 within their home 118. Aspects regarding exemplary input and output devices that the customer can use to see the view 108 and provide input to the system are described in greater below.

In some embodiments, the view 108 can also be seen by a company representative 120 (which could be a sales associate, a customer service representative, or the like) from a remote location 122 or, in some scenarios, from the customer's home. In some cases, the view seen by the company representative can be the same as the view 108 seen by the customer 116. However, in some cases the view seen by the company representative can be different, such as by including additional information, options and the like.

As referenced above, a building component project can go through various steps. The building component system can be responsive to and support each step of the process. As an example, the project can start off as a sales lead 150. In some cases, the sales lead 150 can represent an inquiry from a prospective customer 116. At this step, the view 108 can be generated by the system 100 in order to present building component options to the customer 116. As such, the system 100 can render a view 108 including a building component 110 superimposed over a surrounding environment 112. Also, a unique key 170 can be generated to identify the particular project, particular customer, and/or particular installation environment address and can be stored in the project file 104.

In this example, the project can proceed to a sales step 152. In some cases, a company representative 120 can participate in the process and can see the same view or a similar view as the customer 116. In other embodiments, the customer 116 can proceed through the sales step 152 without the participation of a company representative 120. The system 100 can present building component options to the customer through an output device and receive a building component selection from a customer 116 through an input device. The view 108 rendered by the image generation system 106 can include the building component selection made by the customer. In some cases, the view 108 can also include subcomponent and/or relevant configuration options based on a first or preceding building component selection made by the customer. It will be appreciated that, in some embodiments, receiving a building component selection can also occur at the sales lead 150 step or, in some cases, at a later step. Information regarding the building component selection made by the customer 116 can be stored in the project file 104 within the database 102. The measurement professional may also perform an evaluation of the conditions of existing components and surrounding structures to determine the extent of work needed to perform the installation.

In some embodiments, the system 100 can obtain dimensional information about the environment in which the building component will be installed (installation environment) that is sufficiently accurate to proceed to obtain or manufacture the building component. Such dimensional information can be gathered in various ways. In some embodiments, the system can queue a visit from a measurement professional to gather dimensional information regarding the installation environment. In other embodiments, a device within the installation environment can be used to gather dimensional data. The step of measuring 154 can, in some embodiments, include a measurement professional taking precise measurements in order to ensure that the correct size building component is produced for the customer 116. The dimensional information gathered during the measurement professional visit can also be stored in the project file 104 within the database 102.

In some embodiments, the project can also include a step of ordering and/or manufacturing the specific building component 156 that was selected by the customer 116. The step of ordering and/or manufacturing the specific building component can specifically include a step of queueing manufacturing of the building component selection. In some embodiments, the step of ordering and/or marking the specific building component can specifically include a step of queuing an installation event after the building component selection is manufactured.

In some embodiments, the project can include a step of installing 158 the previously selected and ordered building component. The building component can be installed within the installation environment by an installation professional. A view 108 can be rendered by the image generation system 106 for the installation professional to see that can provide visual verification of the building component that is to be installed as well as notes about the installation environment that are relevant for the installation professional.

In some embodiments, the project can also include a step of providing after-sales information and/or service 160 to the customer 116. By way of example, the customer 116 may contact the company after installation of the building component with questions about the building component and/or with requests for service regarding the building component. A view 108 can be rendered by the system 100 for the customer 116 and/or customer service representative in order to facilitate asking and/or answering questions about the building component, and/or identifying, scheduling, or executing service on the building component that may be desired or required.

It will be appreciated that at various steps of the overall process, the interactive features of system 100 can enable remotely interfacing with the customer 116 regarding details of the building component selection using information stored in the project file 104 within the database 102. A view 108 can be rendered by the system 100 for the customer 116 and/or customer service representative to be seen while interfacing together in order to allow them to communicate about the project in a manner enhanced by being able to see a common view of the installation environment and building component to be installed.

Figure 2:
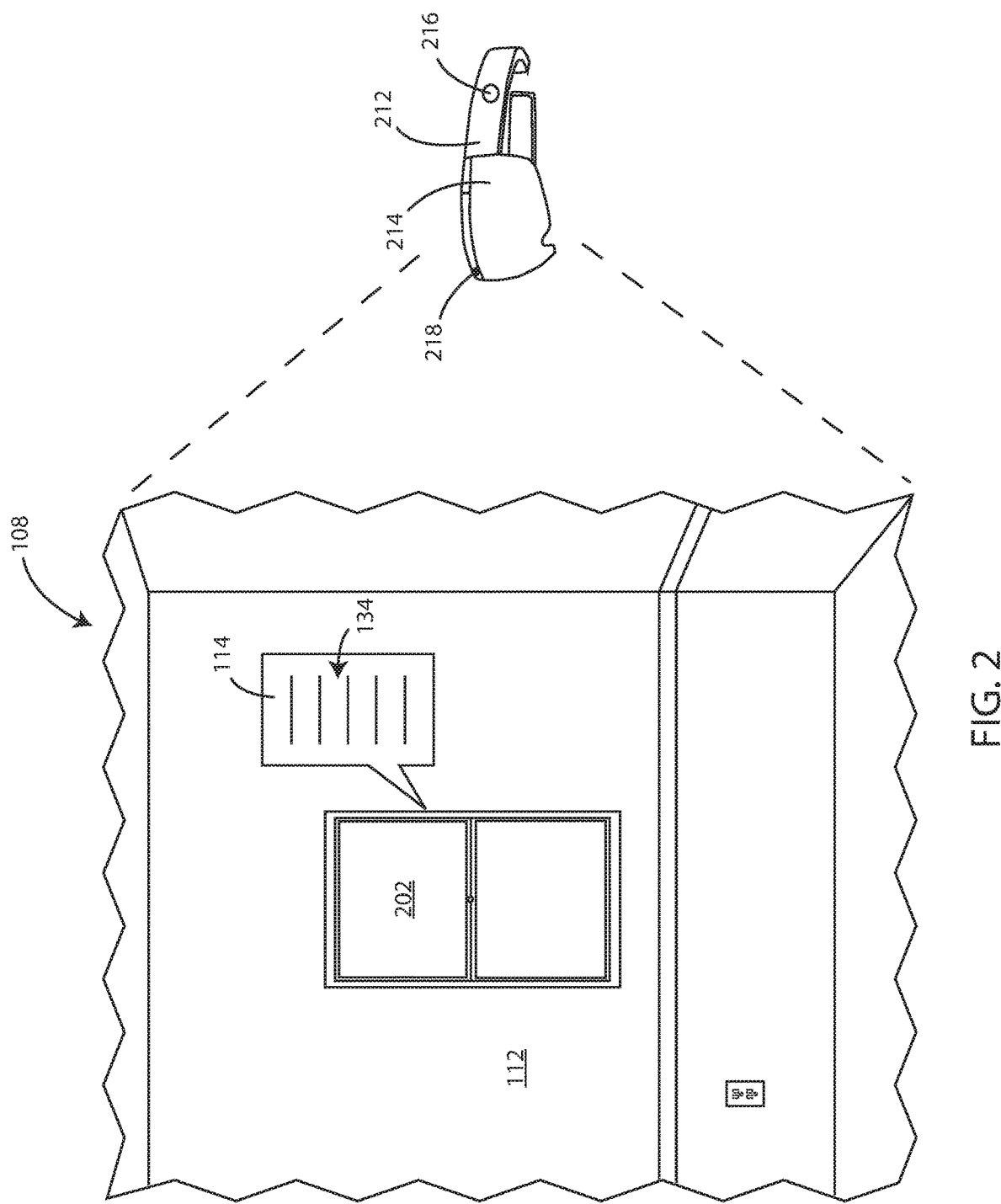
FIG. 2 is an example of a view rendered by an image generation system in accordance with various embodiments herein.

Views rendered by the system can take many different specific forms. Referring now to FIG. 2, an exemplary view 108 rendered by an image generation system 106 is shown in accordance with various embodiments herein. In this view, a surrounding environment 112 and user interface panel 114 including data 134 specific to the installation project is shown. In this view, an original building component 202 (e.g., a previously installed building component that is to be replaced) is shown. As such, this view 108 may represent an early stage of the process before the customer 116 has made building component selections.

This view 108 may be seen by the customer 116 and/or a company representative 120 such as a sales associate or a customer service representative using a viewing device such as a viewing goggles 212. In some embodiments, the viewing goggles 212 can be augmented reality, mixed reality, or virtual reality goggles. The viewing device can, in some embodiments, include a camera 218 or other video input device. The viewing device can include a video output device 214. The viewing device can also include a user input device 216 such as a button. While the viewing device shown in FIG. 2 takes the form of viewing goggles, it will be appreciated that viewing devices herein can also include devices such as a computer, a smart phone, a tablet device, a projector, or any other type of device capable of displaying or otherwise projecting a video image. In some embodiments, the view 108 may be rendered by hardware located remotely from the location of the customer 116 and/or the company representative and transmitted to the viewing device for display at the location of the customer 116 and/or the company representative. In other embodiments, the view 108 may be rendered by hardware associated with the viewing device itself or otherwise located at the location of the customer 116 and/or the company representative. While not shown in FIG. 2, the viewing device, or another device within the surrounding environment, can be equipped with various sensors including, but not limited to, laser sensors, ultrasonic sensors, directional sensors, mapping sensors, acoustic sensors, motion sensors, light sensors, and the like. Various other aspects of augmented reality systems are described in U.S. Pat. Appl. No. 2012/0113140, the content of which is herein incorporated by reference.

Augmented reality systems can include a video camera system equipped with accelerometers and gyroscopes, along with digital computing capability to calculate location and direction from accelerometer and gyroscope data, to provide location and direction data, as well as a pair of video cameras for stereoscopic imaging. Elements of the system can be carried about the area to be recorded, starting at a zero location and direction determined by the user, and scanned through 360 degrees in each room to obtain a complete collection of images, along with a coordinate location and direction of the camera system for each image. An augmented reality viewing device, also equipped with accelerometers and gyros, along with computing capability, can then be used to view the recorded images using, for example, special electronic viewing eyewear. By moving about the room and looking in various directions, the homeowner can see a recorded image of the room, in augmented reality form, meaning that the displayed images are those that the viewer would see from the same position and looking in the same direction as would be seen without the display device. The advantage of viewing the interior using the augmented reality display, as opposed to taking off the goggles and just looking at the same view of the room itself, is that a three-dimensional portrayal of a proposed replacement building component, such as a window, can be digitally superimposed on the augmented reality portrayal of the room. In addition, in some scenarios, the homeowner may already have an augmented reality viewing device that can be used to view the purchased building component at a later time with data recording media left with the customer by the company representative, such as a sales person.

Referring again to FIG. 2, user interface panel 114 may be provided to display data relating to the installation, as well as icons for activating other functions, such as alternative design choice menus, dimensional data, or condition of the existing installed component. Panel 114 may be activated by user input button on viewing goggles 212, or by other suitable input devices used by the customer or by a company representative.

Figure 3:
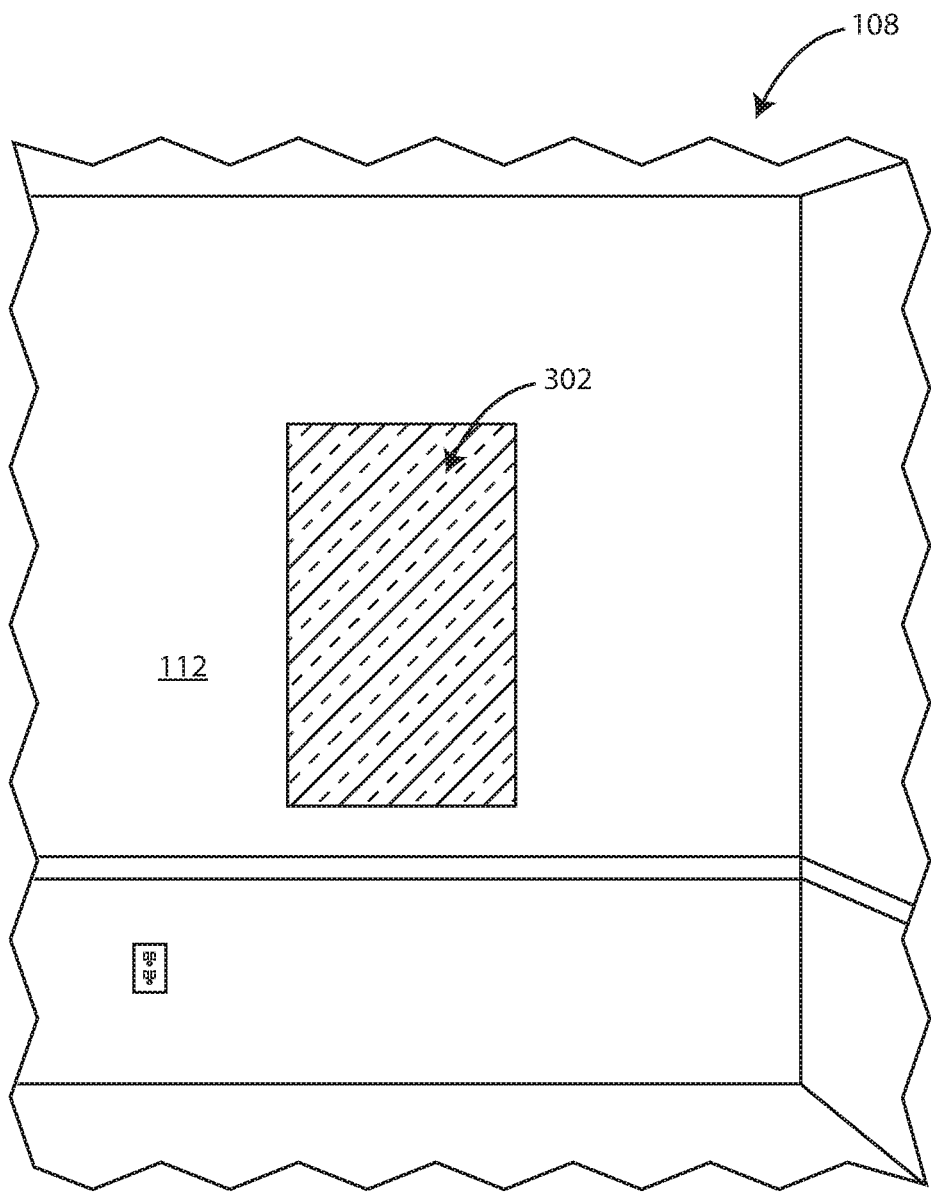
FIG. 3 is an example of a view rendered by an image generation system in accordance with various embodiments herein.

Referring now to FIG. 3, an exemplary view 108 rendered by an image generation system 106 is shown in accordance with various embodiments herein. In this view, a surrounding environment 112 is shown and a sizing reticle 302 is shown positioned over where the building component will need to be superimposed by the system 100. The sizing reticle 302 can be used to aid in verifying that superposition of the building component is taking place in the correct location and that the building component is being superimposed at the correct size and/or scale. In some embodiments, this sizing reticle 302, or a similar type of image, can be manipulated by the customer 116 and/or the company representative 120 in order to adjust its size and/or location. However, in some embodiments, the display of the sizing reticle 302 can be omitted. In some embodiments, the use of a sizing reticle 302 may not be visible to the customer 116, but only by the company representative 120. In still other embodiments, the sizing reticle 302 may be generated automatically by the system 100 but may not be visually displayed.

Figure 4:
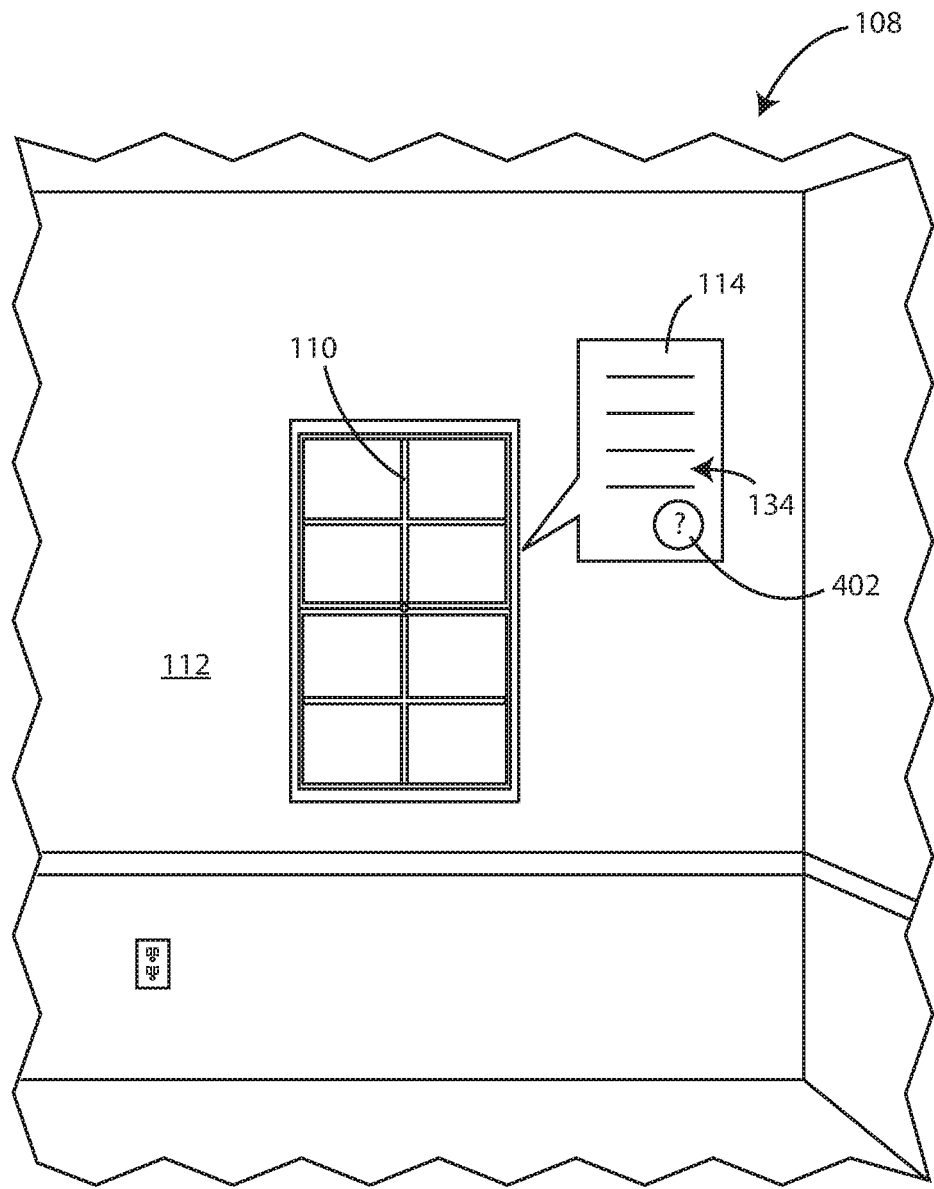
FIG. 4 is an example of a view rendered by an image generation system in accordance with various embodiments herein.

Referring now to FIG. 4, an exemplary view 108 rendered by an image generation system 106 is shown in accordance with various embodiments herein. In this view, a surrounding environment 112 and user interface panel 114 including data 134 specific to the installation project is shown with a selected building component 110 superimposed by the system 100. The building component 110 is positioned over the original building component 202 from FIG. 2. Aspects of image generation systems for rendering this view 108 are described in greater detail below.

Views generated by the system can also include various pieces of data that are relevant to the customer and/or the company representative. This relevant data can be displayed on a user interface panel 114 or other type of virtual object within the virtual reality, augmented reality, or mixed reality view. By way of example, relevant data can include, but are not limited to, product identification information, pricing data, product configuration options, manufacturing lead-time estimates, notes from previous interactions with the customer, and the like. In some embodiments, other types of objects can also be displayed on or near the user interface panel 114. For example, an assistance icon 402 can be displayed on the user interface panel 114. If the user selects or otherwise engages the assistance icon 402, then the system 100 can issue an alert or notice to a company representative, such as a customer service representative or a salesperson (depending on the stage of the project), who can then be shown the same or similar view 108 and interact with the customer 116, such as in the scenario illustrated in FIG. 5.

Figure 5:
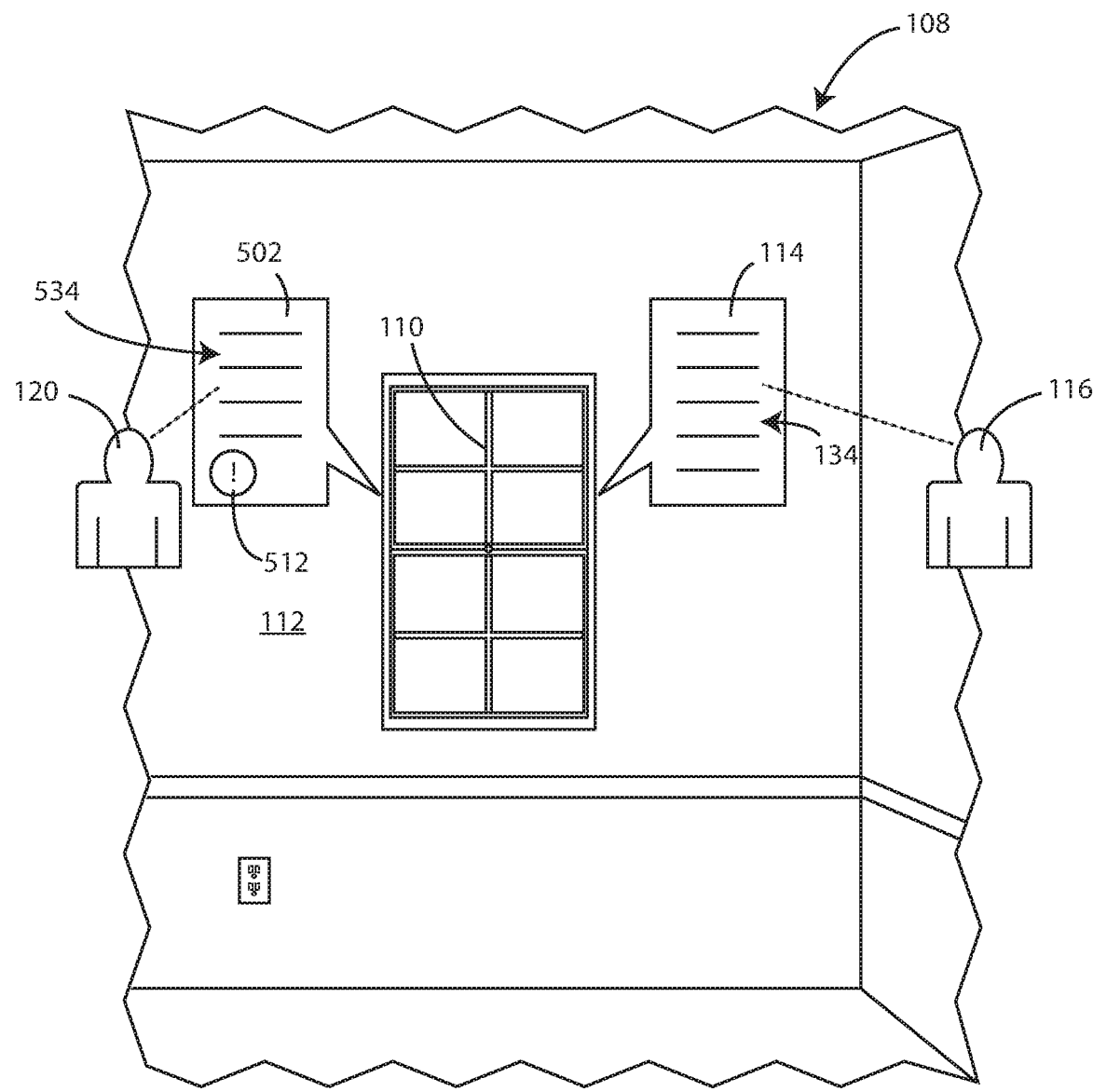
FIG. 5 is an example of a view rendered by an image generation system in accordance with various embodiments herein.

Referring now to FIG. 5, an exemplary view 108 rendered by an image generation system 106 is shown in accordance with various embodiments herein. In this view, a surrounding environment 112 and user interface panel 114 including data 134 specific to the installation project is shown along with a selected building component 110 superimposed by the system 100. The building component 110 is positioned over the original building component 202 from FIG. 2. In this example, the customer 116 can see a first user interface panel 114 including a first set of data 134 relevant to the installation project and the company representative 120 can see a second user interface panel 502 including a second set of data 534 relevant to the installation project. In some embodiments, special alert icons 512 can be visible to the company representative 120, but not to the customer 116. Special alert icons 512 can provide information to the company representative 120 can may be of special importance when providing information to the customer 116 or otherwise interacting with the customer.

In various embodiments, the building component project management system can further include a dimension measuring system configured to measure dimensions in the actual installation environment. The building component project management system can be configured to record and store measured dimensions of the actual installation environment in the database. Dimensional measuring can be performed using inputs from various hardware components and/or sensors that can be part of the system 100 including, but not limited to, video inputs, laser sensors, ultrasonic sensors, acoustic sensors, and the like.

Figure 6:
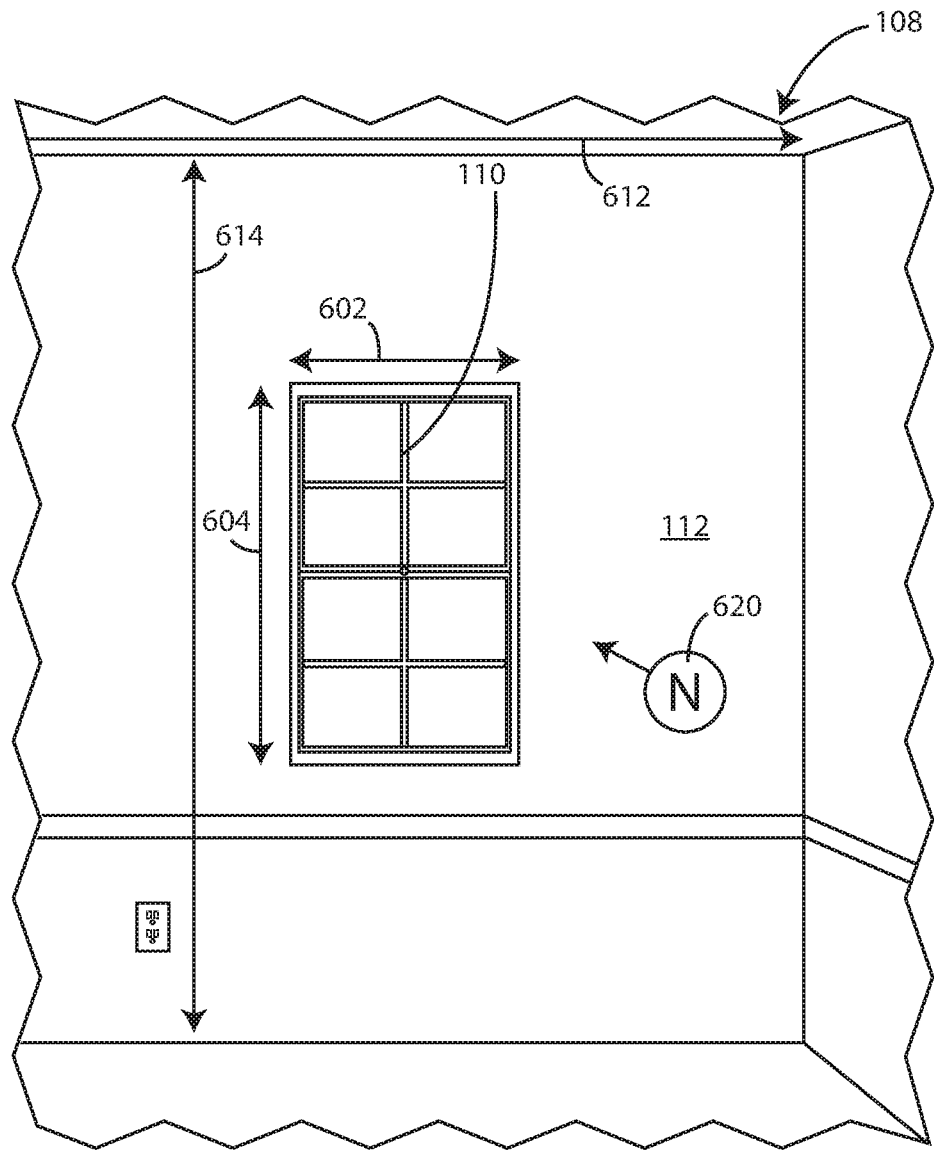
FIG. 6 is an example of a view rendered by an image generation system in accordance with various embodiments herein.

Referring now to FIG. 6, an exemplary view 108 rendered by an image generation system 106 is shown in accordance with various embodiments herein. In this view, a surrounding environment 112 is shown with a selected building component 110 superimposed by the system 100. The building component 110 is positioned over the original building component 202 from FIG. 2. The system can take various measurements. By way of example, measurements can include a width 602 and a height 604 of the building component 110. Measurements can also include a width 612 and a height 614 of a wall onto which a building component 110 is superimposed. In some embodiments, measurements can also include a direction 620 of a wall onto which a building component 110 is superimposed. Dimensional measurements can be performed using inputs from various hardware components and/or sensors including, but not limited to, video inputs, laser sensors, ultrasonic sensors, acoustic sensors, and the like. One approach for measuring distances using a laser sensor is described in U.S. Pat. No. 7,283,214, the content of which is herein incorporated by reference. However, it will be appreciated that many other techniques for measuring dimensions using sensors can also be used. Dimensional measurement can also be manually taken and recorded and stored in the system.

In some embodiments, a local interior electronic coordinate system (local positioning system, or LPS), analogous to the world-wide GPS system, can be electronically created. A stereoscopic video recording system having a device for reading LPS coordinate locations can then be used to create an augmented reality image of, for example, a room in which replacement building materials are to be installed. A viewing device can then read the location and direction of the viewing device and call up the appropriate images to enable the viewer to see an augmented reality image.

In various embodiments, the building component project management system can be configured to record and store information regarding other building components in the actual installation environment. For example, in a scenario where a room includes a first window that is to be replaced and a second window that is not to be replaced, the system can also record and store information about the second window to facilitate future installation projects that may include the second window.

Figure 7:
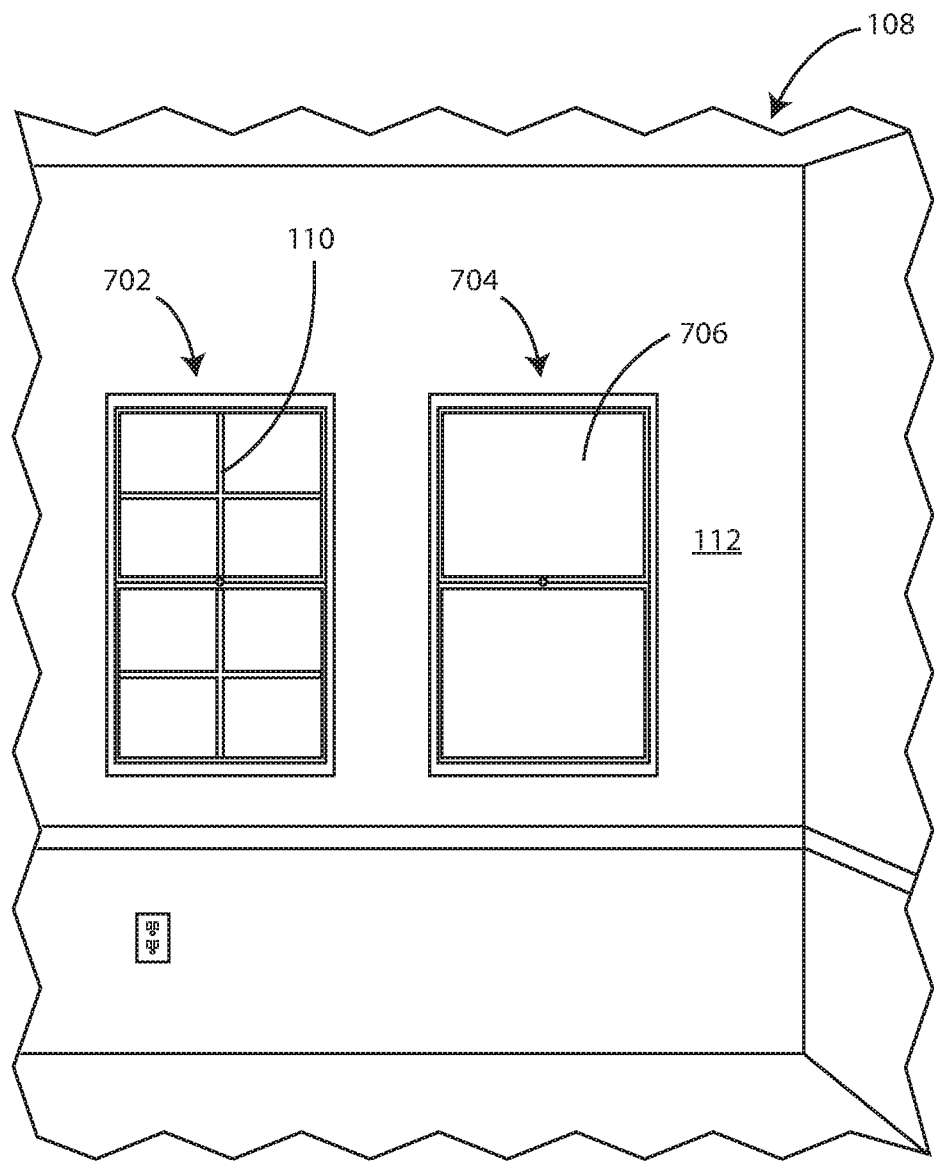
FIG. 7 is an example of a view rendered by an image generation system in accordance with various embodiments herein.

Referring now to FIG. 7, an exemplary view 108 rendered by an image generation system 106 is shown in accordance with various embodiments herein. In this view, a surrounding environment 112 is shown with a selected building component 110 superimposed by the system 100. The first building component 110 is positioned in a first position 702 over a first original building component. A second building component 706, representing a building component that is not being replaced, is shown in a second position 704 within the surrounding environment 112.

Figure 8:
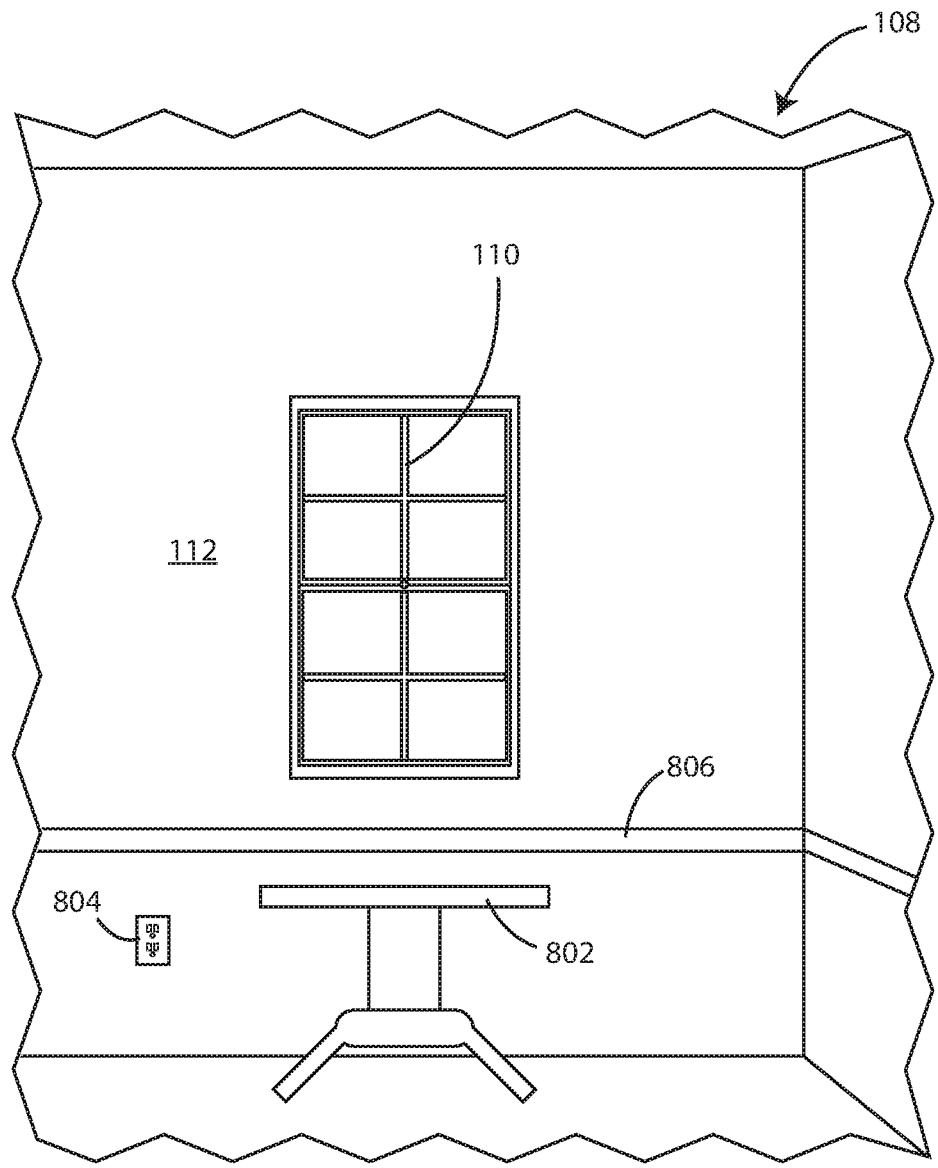
FIG. 8 is an example of a view rendered by an image generation system in accordance with various embodiments herein.

In some embodiments, the system can recognize and distinguish between different types of objects in the actual installation environment. Referring now to FIG. 8, an exemplary view 108 rendered by an image generation system 106 is shown in accordance with various embodiments herein. In this view, a surrounding environment 112 is shown with a selected building component 110 superimposed by the system 100. In some embodiments, the system can identify objects and then classify them according to type. For example, the system can identify different types of objects as being of a type that is generally permanent or relatively permanent such as trim 806 and electrical outlet 804 versus being of a type that is commonly moved such as table 802 (or lamp, picture, movable decorative element, or item sitting on a shelf or table). U.S. Pat. No. 6,952,496, the content of which is herein incorporated by reference, describes one exemplary object recognition technique. However, it will be appreciated that many different object recognition techniques and algorithms can be used.

In some embodiments, the system can compare objects identified in a real-time view of the installation environment (or surrounding environment) versus objects identified in a previously stored view of the installation environment. If one or more objects classified as being of permanent or relatively permanent no longer appear within the view or have changed position relative to the placement of a building component this may be indicative of a problem or error in how the view has been rendered. As such, in some embodiments, after comparison of objects identified in a real-time view of the installation environment (or surrounding environment) versus objects identified in a previously stored view of the installation environment, if the system identifies that one or more objects classified as being of permanent or relatively permanent status no longer appear within the view or have changed position relative to the placement of a building component, then the system can issue a warning or notification. The warning or notification can show up as a special alert icon 512, such as that shown in FIG. 5, which can be viewable by a company representative 120 and/or a customer 116.

In some embodiments, the view rendered by the system can also include user interface objects. These user interface objects can be viewed by a person as part of the overall view. In some embodiments, the person can interact with the user interface objects in order to make selections and/or otherwise provide input to the system. In some embodiments, the user interface objects can be selection panels wherein one or more relevant choice possibilities are presented (visually and/or textually) on the panel and then the user can directly select options from the panel.

Figure 9:
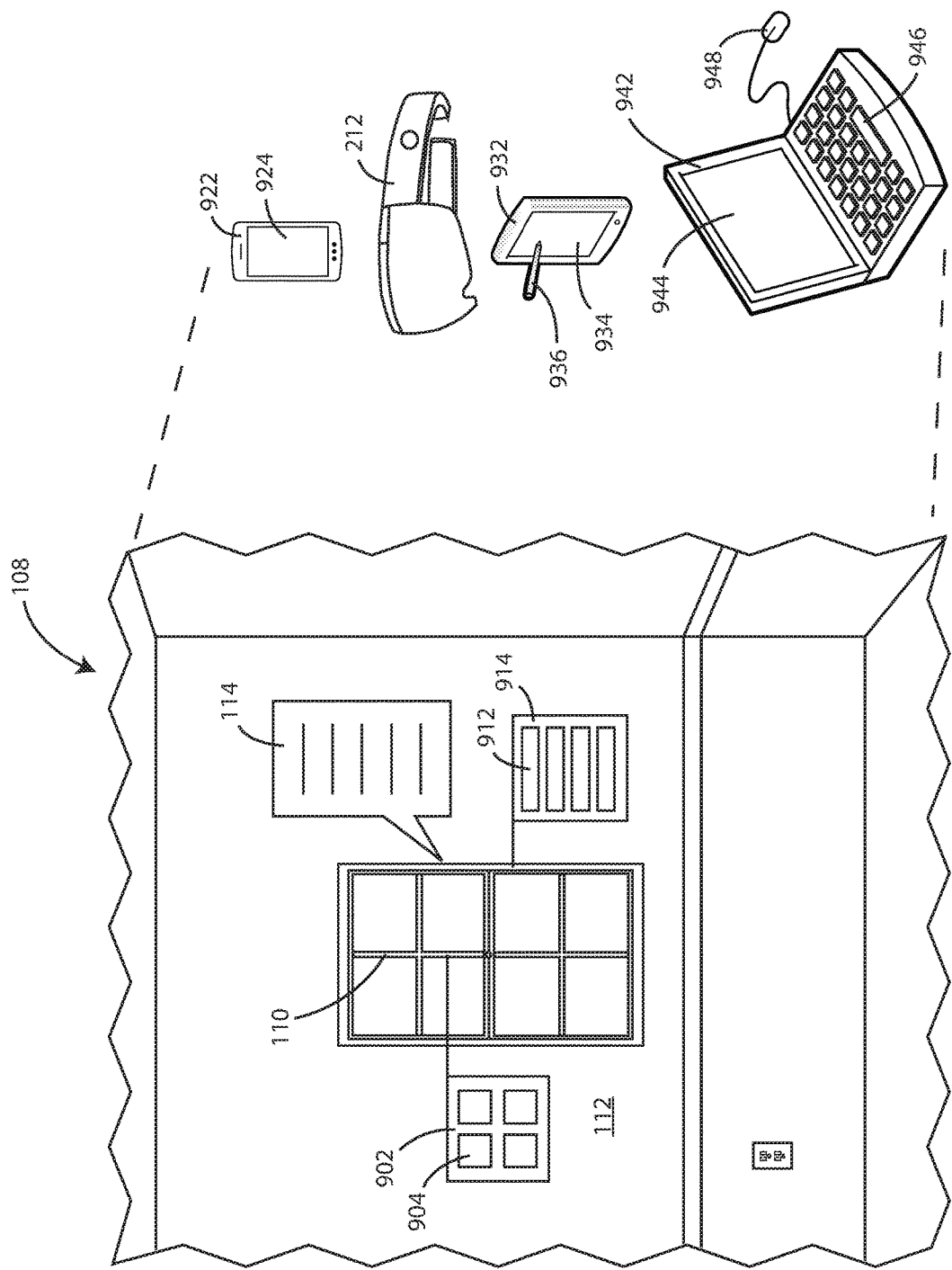
FIG. 9 is an example of a view rendered by an image generation system in accordance with various embodiments herein.

Referring now to FIG. 9, an exemplary view 108 rendered by an image generation system 106 is shown in accordance with various embodiments herein. In this view, a surrounding environment 112 is shown with a selected building component 110 superimposed by the system 100. A user interface panel 114 including data 134 specific to the installation project can optionally be shown within the view 108 generated by the system. A first selection panel 902 is shown with a first set of options 904, such as available grill patterns for the building component 110. In some embodiments, display of the first selection panel 902 can be invoked by a direct contact with a currently displayed grill or a location where the grill would be placed. A second selection panel 912 is shown with a second set of options 914, such as available colors, stains, or woods for a portion of the building component 110. In some embodiments, display of the second selection panel 912 can be invoked by a direct contact with a currently displayed portion of the building component or a location where the selections are relevant.

The view 108 may be seen by the customer 116 and/or a company representative such as a sales associate or a customer service representative using a viewing device such as a viewing goggles 212. In some embodiments, the viewing goggles 212 can be augmented reality, mixed reality, or virtual reality goggles. The viewing device can also take the form of other devices including, but not limited to, a computer 942, which can include an output such as a video screen 944, and input devices such as a keyboard 946, a mouse 948 and the like. The viewing device can also take the form of a tablet device 932 which can include components such as a touch screen 934, an interface device such as a pen 936, and other components. The viewing device can also take the form of a smart phone 922 or other mobile computing device, which can include components such as a touch screen 924, a camera, a microphone, speakers and the like.

Image Generation System

The system can include an image generation system in order to render views described herein. The hardware for rendering views can be located remotely from users who receive the views (remote), can be located at the same physical site as the users who received the views (local), or can have hardware distributed between remote and local locations. As such, processing steps herein can be performed locally, remotely (such as in the cloud or at the site of a building component seller or manufacturer), or can be partially performed locally and partially be performed remotely.

In some embodiments, the view can be rendered for viewing as a two-dimensional image. In some embodiments, the view can be rendered for viewing to be perceived as a three-dimensional image. Systems for displaying visual information in three dimensions are typically based on mechanism for providing a first image to one eye of a user and a second image, different than the first, to a second eye of the user. In this manner, the image, as perceived by the user can appear to have depth and therefore appear to be in three-dimensional. In some cases, a separate video image can be provided to each eye of a user through separate video screens or separate portions of a single video screen. In other cases, the separate video screens can be disposed within a headset or goggles.

However, in some cases, a single video screen can be used in combination with a technique to allow each eye to see different aspects of the screen, such as with polarized eyewear. In some embodiments, a stereoscopic image including a left image and a right image that is spatially multiplexed within the stereoscopic image can be presented to a left eye and a right eye respectively of the user of a left polarizing filter and a right polarizing filter. An exemplary approach of this type is described in US 2007/0043466, the content of which is herein incorporated by reference.

It will be appreciated that systems herein can have various form factors in order to provide a user interface including a view of a three-dimensional model of a patient's anatomy. By way of example, the system can include a headset with one or more screens to show separate images to the left and right eye, a screen with a multiplexed left and right image and glasses to cause the left eye to see the left image and the right eye to see the right image, or a similar system. In some embodiments, the system can include sensors so as to track the position of a user's head. One approach for tracking the position of a user's head is described in US 2013/0128011, the content of which is herein incorporated by reference.

In some embodiments, the system can include a graphical display and a machine-readable medium comprising instructions. The instructions can perform various operations when implemented by one or more processors. By way of example, the operations can include those in accordance with methods as described herein. The machine-readable medium can include random access memory (RAM), read-only memory (ROM), magnetic data storage media, optical data storage media, flash memory, and the like.

Devices to render and/or display views described herein can include components common to many computing devices. By way of example, with reference to FIG. 10, the system can include a central processing circuit that can include various components such as a central processing unit. By way of example, the system can include a central processing unit (CPU) 1002 or processor, which may include a conventional microprocessor, a graphical processing unit (GPU) 1004, random access memory (RAM) 1014 for temporary storage of information, and read only memory (ROM) 1016 for permanent storage of information. A memory controller 1010 can be provided for controlling system RAM 1014. A bus controller 1008 is provided for controlling data bus 1012, and an interrupt controller 1006 is used for receiving and processing various interrupt signals from the other system components.

Mass storage can be provided by a magnetic or flash memory drive 1022 including removable or non-removable media, which is connected to bus 1012 by controller 1018, and/or a hard disk drive 1024 (magnetic or solid state), which is connected to bus 1012 by controller 1020. In some embodiments, mass storage can be provided by a device connected through a universal serial bus (USB), eSATA, FireWire, or Thunderbolt interface or other type of connection. User input to the system may be provided by a number of devices. For example, an input device 1028 can be connected to bus 1012 by input controller 1026.

A video processing circuit can be included and, in combination with the GPU 1004 and/or CPU 1002 can generate a view described herein. The video processing circuit can include a video controller 1030 or video output, which controls video display 1032. The video processing circuit can be in communication with the central processing circuit.

The system can also include a communications interface 1034 or communications circuit which allows the system to interface and exchange data with other systems and/or servers located remotely or locally. The communications circuit can be in communication with the central processing circuit. In some embodiments, the communications interface 1034 can include a network interface card or circuit to facilitate communication with a packet switched (such as IP) or other type of data network.

Figure 10:
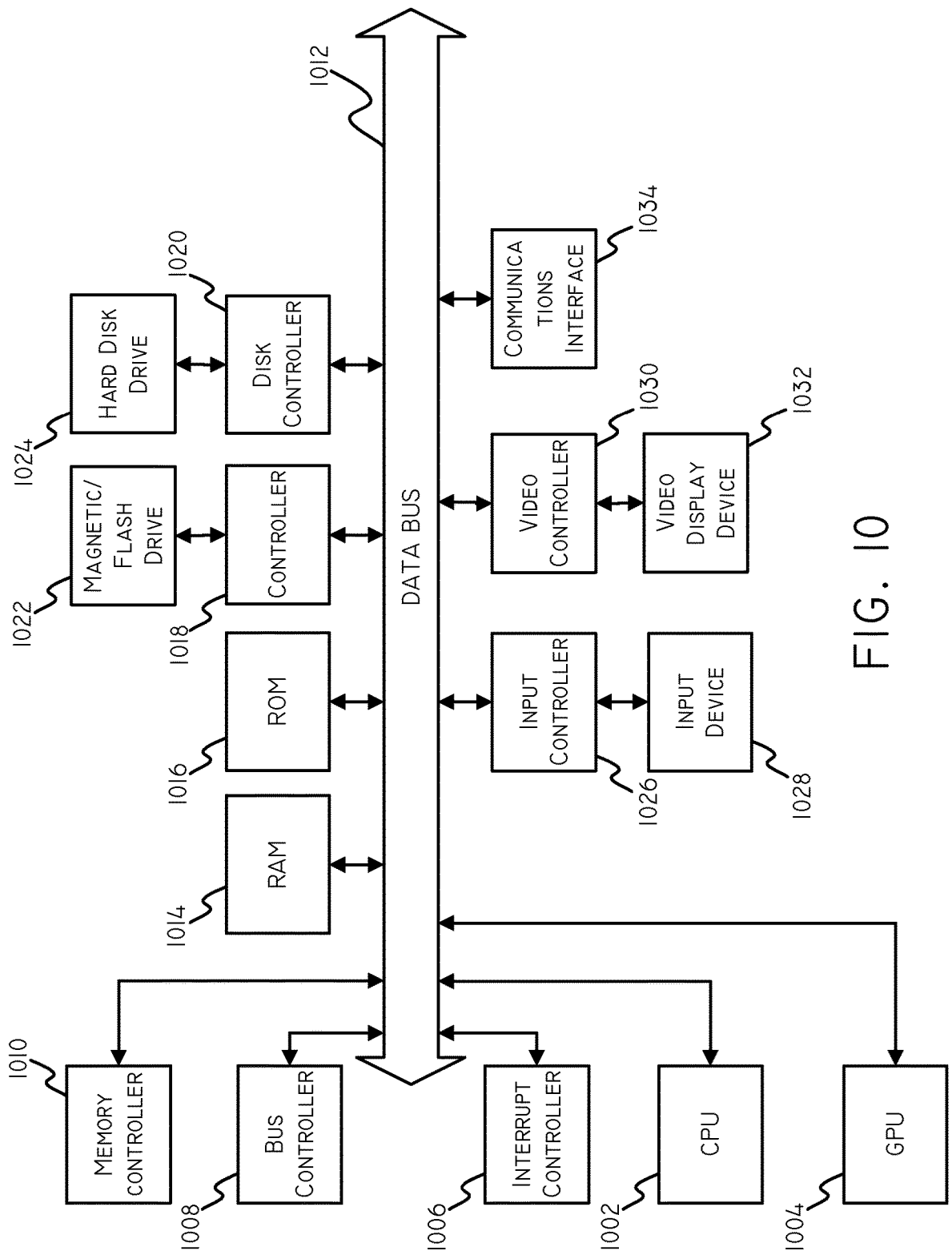
FIG. 10 is a schematic view of hardware components associated with various embodiments herein.

It will be appreciated that some embodiments may lack various elements illustrated in FIG. 10. In addition, the architecture shown in FIG. 10 is merely one example of how discrete components can be arranged and other architectures are explicitly contemplated herein.

In addition to, or instead of, the components described with respect to FIG. 10, it will be appreciated that the system can also include a microcontroller, a programmable logic controller (PLC), an ASIC, an FPGA, a microprocessor, or other suitable components.

The video processing circuit (either locally or on a remote node) can generate a 3D (or fewer dimensions) image based on information including one or more of geometry, viewpoint, texture, lighting and shading information, and the like. The term "graphics pipeline" or "view rendering pipeline" can be used to refer to the sequence of steps used to create a 2D raster representation of a 3D scene. The video processing circuit and/or GPU can execute one or more steps of the graphics pipeline. The video processing circuit and/or GPU can also include one or more physical components used in the graphics pipeline. Using the information described above, the graphics pipeline can include one or more stages of creating a scene out of geometric primitives, modelling and transformation, camera transformation, lighting, projection transformation, clipping, scan conversion or rasterization, and texturing and fragment shading. In various embodiments, other operations can also be performed. In various embodiments, the graphics pipeline can use OpenGL, DirectX, or other protocols.

Figure 11:
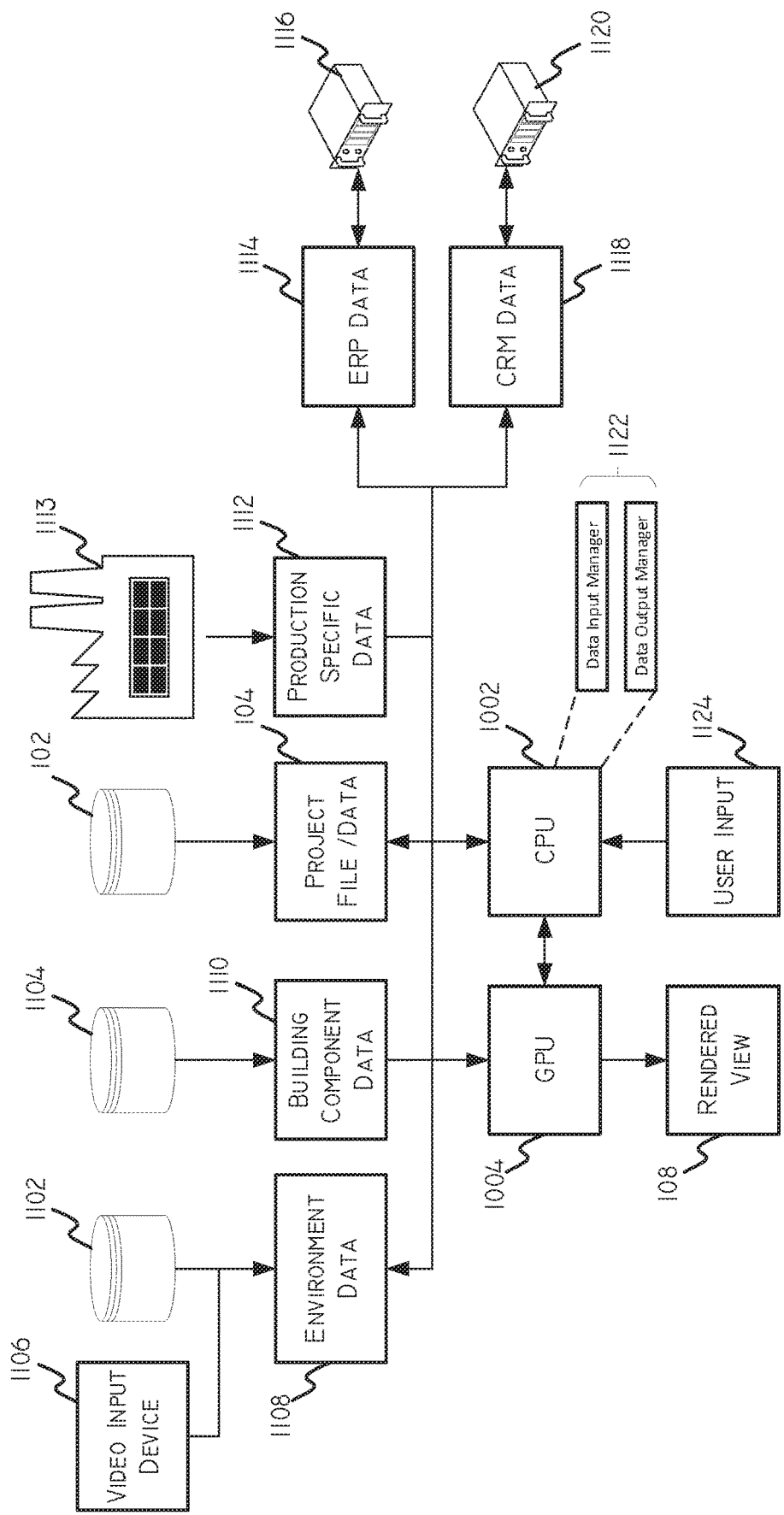
FIG. 11 is a schematic view of data flow in a view rendering pipeline in accordance with various embodiments herein.

FIG. 11 is a schematic view of data flow in a view rendering pipeline in accordance with various embodiments herein. Environment data 1108, which can include information about the installation environment such as lighting, color, shapes, raster images of the installation environment, etc. can be obtained from a video input device 1106, such as a camera or other type of photodetector. In some cases, the video input device 1106 can be integrated into the viewing device used by the system user such as in the case of virtual, augmented or mixed reality viewing goggles or a smart phone that has a built-in camera. In some cases, however, environment data 1108 is stored in advance and then retrieved from a database 1102. Building component data 1110 can be obtained from another database 1104. Building component data 1110 can include information about the shape, color, texture, appearance, etc. of building components so that they can be realistically superimposed over image of the installation environment. Project data can be obtained from a project file 104 which can stored within a database 102. Production specific data 1112, including data such as production status, manufacturing or order lead-time, part availability, and the like can be obtained from a production facility 1113 or other company-associated system or site. Many other sources of data can also be utilized. For example, ERP data 1114 and be obtained from an ERP system 1116 and CRM data 1118 can be obtained from a CRM system 1120. In some embodiments, still other systems such as estimating systems, guide generation systems, and the like can provide data to the system herein.

While this example shows multiple separate databases, it will be appreciated that the information referred to herein can be stored in a single database or can be spread out across many distinct databases. These various pieces of data can then be processed by a video processing circuit and/or GPU 1004 and/or a CPU 1002 using various techniques described above. The output from the video processing circuit and/or GPU 1004 can be a rendered view 108. In various embodiments, user input 1124 can be provided back to components of the system which can then be stored in one or more of the databases shown and/or can lead to changes to the rendered view 108. In some embodiments, modules 1122, such as a data input manager and/or a data output manager, can be executed at the level of the CPU 1002.

User Identification System

Various embodiments herein can include a user identification system. The user identification system can be configured to identify a system user. In some embodiments, the system can then configure access to records in the database according to the identified user. In some embodiments, the system can then configure the data that can be part of the view rendered by the image generation system according to the identified user.

Figure 12:
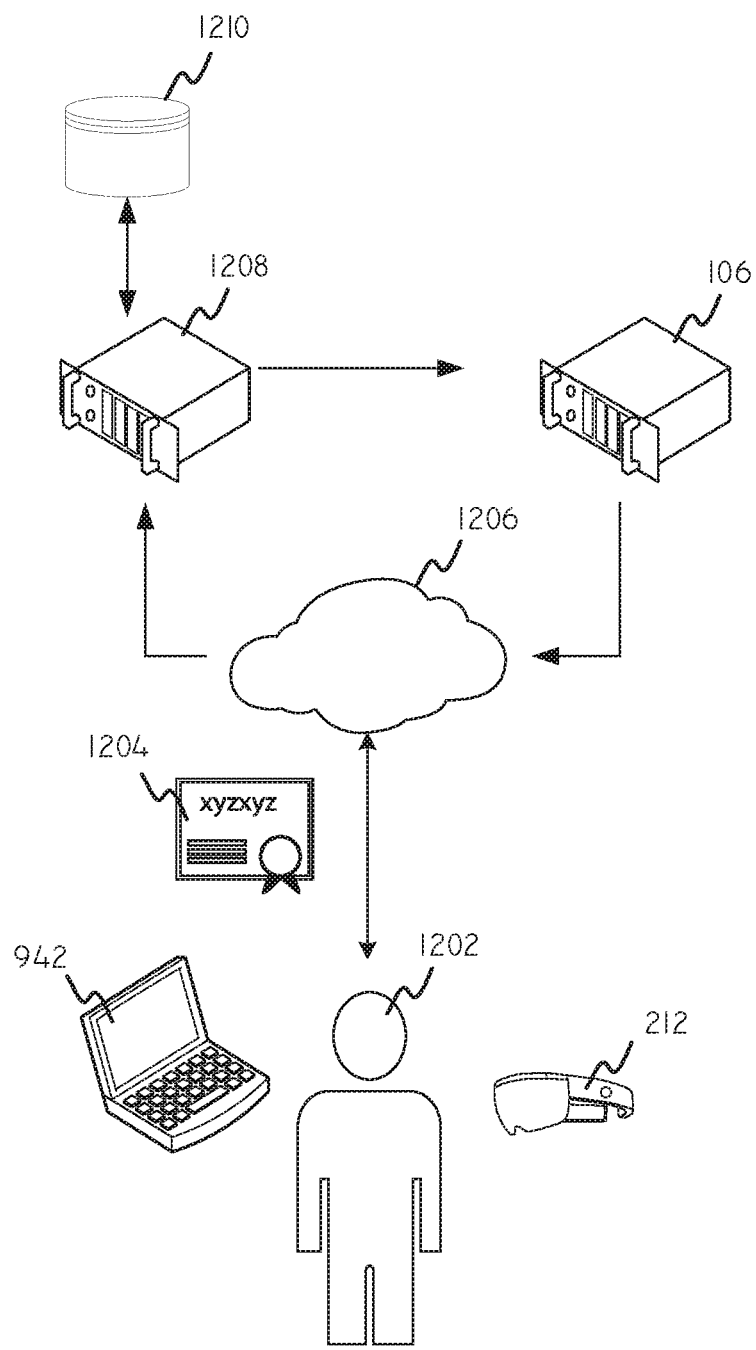
FIG. 12 is a schematic view of components of an exemplary user identification system in accordance with various embodiments herein.

Referring now to FIG. 12, a schematic view of an exemplary user identification system is shown as interfacing with other components of an embodiment of a system herein. In specific, a system user 1202 can use viewing goggles 212 or another type of device with data input capabilities such as a computer 942 in order to provide their credentials 1204 through a data network 1206 to a user identification system 1208. The user identification system 1208 can check the provided credentials 1204 against records stored in a user database 1210 in order to authenticate the user. The records stored in the user database 1210 can also identify the type or role of the user 1202. Exemplary system roles herein can include, but are not limited to, a customer (including prospective and/or actual customers), an salesperson, a measurement professional, a customer-support representative, an installer, a service provider, a sales or project manager, and the like.

User identity and/or role information can be supplied to an image generation system 106 in order to render (partially or completely) a view that is passed back through the data network 1206 in order to provide the view to the system user 1202 using viewing goggles 212 or another type of device with a video display such as computer 942. It will be appreciated that many aspects of the rendered view can change based upon identified role of the user. In some cases, additional data or different data can be displayed. In some cases, different user interface options can be enabled and/or displayed. In some cases, different screens and/or menu options can be provided.

Figure 13:
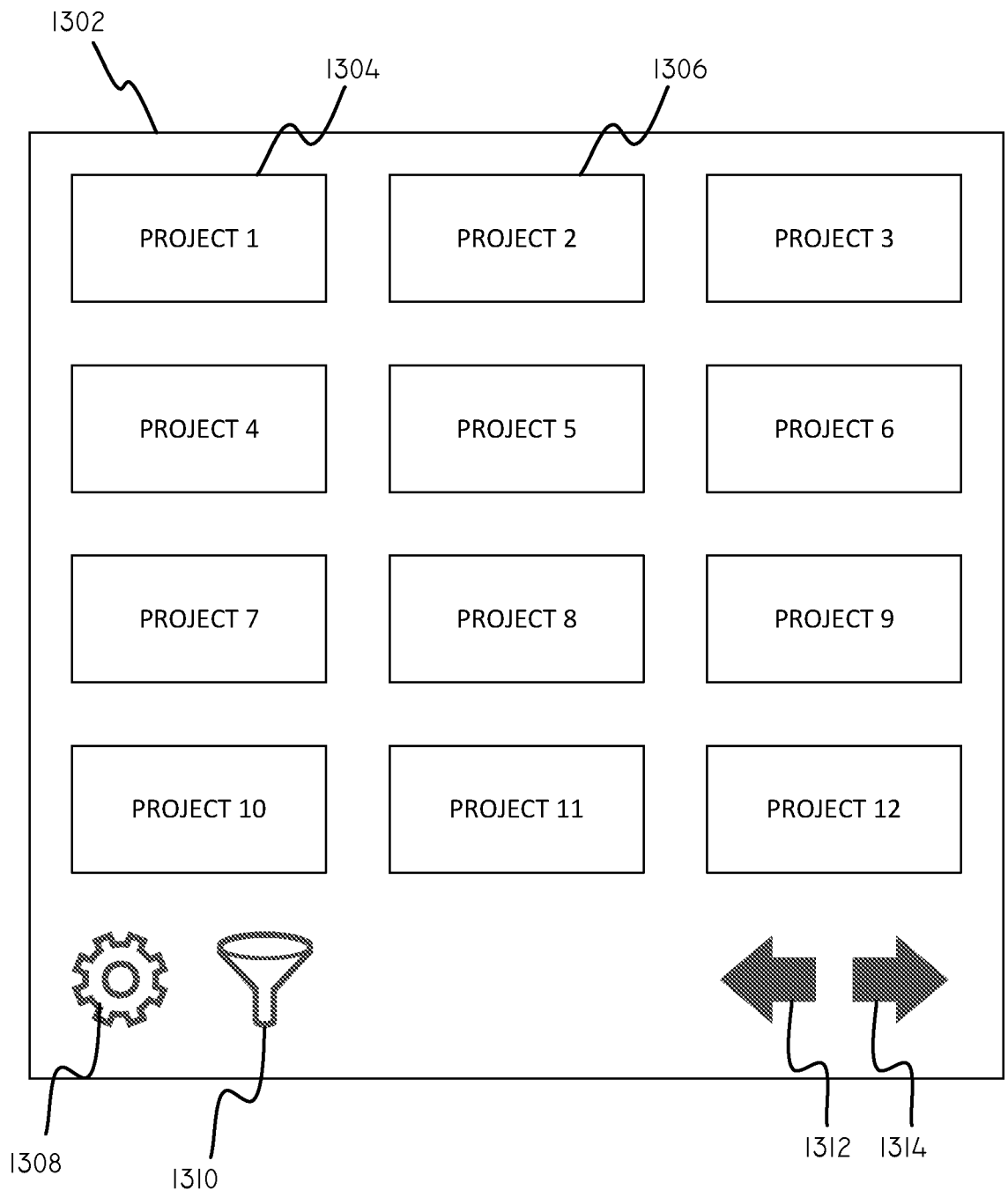
FIG. 13 is a schematic view of a user interface in accordance with various embodiments herein.

Referring now to FIG. 13, a schematic view of a user interface is shown in accordance with various embodiments herein. In particular, the user interface shown in FIG. 13 can be associated with an identified manager role, such that this user interface is only available to those users identified by the user identification system as being a manager. The user interface can include a panel 1302 including graphical objects 1304, 1306 or icons associated with specific projects. The user interface panel 1302 can also include option icons 1308, 1310 as well as navigational icons 1312, 1314. Selecting a graphical object 1304 or 1306 associated with a specific project by clicking on it or otherwise interfacing with it can allow the user to see a view 108, such as those described above, associated with the particular selected project.

Methods

Various embodiments are included herein. In some embodiments, a method of managing a building component project is included. The method can include various operations. In some embodiments, the method can include rendering a view of a building component superimposed over a view of a surrounding environment. In some embodiments, the method can include receiving a building component selection from a customer. In some embodiments, the method can include rendering a view of the building component selection superimposed over a view of a surrounding environment. In some embodiments, the method can include storing information regarding the building component selection in a database. In some embodiments, the method can include obtaining dimensional information regarding the information environment. In some embodiments, the method can include storing dimensional information in the database. In some embodiments, the method can include queueing preparation of the building component selection. In some embodiments, the method can include remotely interfacing with the customer regarding details of the building component selection using information stored in the database. In some embodiments, the method can include queuing an installation event after the building component selection is prepared.

In some embodiments, after a customer interfaces with a company representative, such as a sales person, an element can be left behind such as physical media containing digitally stored information and images relating to the building material units that the customer has purchased, or credentials sufficient to allow for access to a project file for the project. In this manner, the customer can access a view such as that generated by the system herein using an element that is left behind with the customer after a company representative visits with the customer either physically or virtually. In some embodiments, data regarding images of the surrounding environment are retained only on the left=behind physical media and not stored in a database by the company. However, in other embodiments, data regarding images of the surrounding environment are uploaded and stored in databases maintained by the company.

In some embodiments, the method can further include queuing a visit from a measurement professional to gather dimensional information regarding the installation environment.

In some embodiments, remotely interfacing with the customer regarding details of the building component selection using information stored in the database further includes rendering a separate view of the building component project state of completion for a customer feedback mechanism.

In some embodiments, the rendered view of the building component selection superimposed over a view of a surrounding environment is a virtual reality environment, mixed reality environment, or augmented reality environment.

In some embodiments, the view of the building component superimposed over a view of a surrounding environment includes a visible palette of options related to the building component.

In some embodiments, the method can further include gathering dimensions of the surrounding environment before rendering the view of the building component superimposed over the view of the surrounding environment.

In some embodiments, the view rendered by the image generation system includes a visible palette of options related to the building component.

In some embodiments, the method can include recording and storing an image of the surrounding environment in the database.

In some embodiments, remotely interfacing with the customer regarding details of the building component selection using information stored in the database can further include rendering a separate view of the building component selection superimposed over a view of a surrounding environment for a customer service representative.

In some embodiments, remotely interfacing with the customer regarding details of the building component selection using information stored in the database further includes rendering a separate view of the building component project state of completion for a customer feedback mechanism.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein. All publications and patent applications in this specification are indicative of the level of ordinary skill in the art to which this invention pertains.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

The invention claimed is:

1. A building component project management system comprising
    a database configured to store records regarding a building component project, and a plurality of user interface options based on a defined role of a user;
    an image generation system, configured to provide a user interface including
        a view of a surrounding physical environment;
        a view of a building component superimposed over the view of the surrounding physical environment; and
        data specific to an installation project;
    a user identification system configured to
        identify the system user by role; and
        configure the data that is part of the user interface rendered by the image generation system according to one of the plurality of user interface options based on the role of the identified user;
    the system configured to record and store in the database a set of physical dimensions of the surrounding physical environment; and
    the system configured to record and store product selections made by a customer in the database.

2. The building component project management system of claim 1, wherein the user interface rendered by the image generation system is a virtual reality environment, mixed reality environment or augmented reality environment.

3. The building component project management system of claim 1, wherein the user interface rendered by the image generation system includes a visible palette of options related to the building component.

4. The building component project management system of claim 1, wherein the system is configured to record and store data forming an image of the surrounding physical environment in the database.

5. The building component project management system of claim 4, wherein existing building components within the surrounding physical environment are designated for replacement or for retention.

6. The building component project management system of claim 1, wherein a build completion state of the building component is recorded and stored in the database.

7. The building component project management system of claim 6, wherein the data specific to the installation project changes based on the build completion state of the building component.

8. The building component project management system of claim 7, wherein the image generation system is configured to render a customer view comprising
    a first view of a building component superimposed over a view of a surrounding physical environment; and
    a first set of data specific to the installation project;
    the image generation system further configured to render a company representative view comprising
    a second view of a building component superimposed over a view of a surrounding physical environment; and
    a second set of data specific to the installation project.

9. The building component project management system of claim 1, further comprising a dimension measuring system configured to measure dimensions in the surrounding physical environment.

10. The building component project management system of claim 1, the building component comprising a fenestration unit.

11. The building component project management system of claim 1, the building component comprising a window.

12. The building component project management system of claim 1, the system configured to render a first view for the first user comprising a first set of data and a second view for the second user comprising a second set of data.

13. The building component project management system of claim 12, wherein the first user is a customer, and the first view comprises an assistance icon configured to issue an alert or notice to a company representative when engaged by the customer.

14. The building component project management system of claim 12, wherein the second user is a company representative, and the second view comprises one or more special alert icons configured to provide information to the company representative, wherein the one or more special alert icons are not visible in the first view.

15. The building component project management system of claim 1, wherein the system is further configured to identify objects in the user interface and classify the objects by type.

16. The building component project management system of claim 15, wherein the system is further configured to classify the objects as being of a permanent type or of a commonly moved type.

17. The building component project management system of claim 1, wherein the define roles for the user comprise: a customer, a sales person, and an installer.

18. A fenestration project management system comprising
a database configured to store records regarding a fenestration project, and a plurality of user interface options based on a role of a user;
an image generation system, configured to provide a user interface including
a first user interface option for a first user having a first role, the first user interface option comprising:
a first view of a surrounding physical environment;
a first view of a fenestration superimposed over the first view of the surrounding physical environment;
a data set specific to an installation project; and
a data set specific to the first role;
a second user interface option for a second user having a second role, the second user interface option comprising:
a second view of the surrounding physical environment;
a second view of the fenestration superimposed over the second view of the surrounding physical environment;
the data set specific to the installation project; and
a data set specific to the second role, wherein the data set specific to the second role is different from the data set specific to the first role;
a user identification system configured to:
identify the system user by role; and
configure the image generation system render the first user interface option or the second user interface option based on the role of the identified user;
the system configured to record and store product selections made by a customer in the database.

19. The fenestration project management system of claim 18, the data set specific to the second role comprising measurements of the fenestration.

20. The fenestration project management system of claim 18, the data set specific to the second role comprising a direction of a wall onto which the fenestration is superimposed.

* * * * *

UNITED STATES PATENT AND TRADEMARK OFFICE
CERTIFICATE OF CORRECTION

PATENT NO. : 11,501,224 B2
APPLICATION NO. : 16/256486
DATED : November 15, 2022
INVENTOR(S) : Jeff Lien It is certified that error appears in the above-identified patent and that said Letters Patent is hereby corrected as shown below:

In the Claims

Claim 17, Column 17, Line 34, "define" should read --defined--

Signed and Sealed this
Ninth Day of January, 2024

Katherine Kelly Vidal
*Director of the United States Patent and Trademark Office*